(12) United States Patent
Battistello (10) Patent No.: US 8,738,900 B2
(45) Date of Patent: *May 27, 2014

(54) METHOD AND DEVICES FOR SECURE COMMUNICATIONS IN A TELECOMMUNICATIONS NETWORK

(75) Inventor: Patrick Battistello, Pessac (FR)

(73) Assignee: France Telecom, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/701,007

(22) PCT Filed: May 26, 2011

(86) PCT No.: PCT/FR2011/051200
§ 371 (c)(1),
(2), (4) Date: Nov. 29, 2012

(87) PCT Pub. No.: WO2011/151573
PCT Pub. Date: Dec. 8, 2011

(65) Prior Publication Data
US 2013/0086649 A1    Apr. 4, 2013

(30) Foreign Application Priority Data

May 31, 2010   (FR) ...................... 10 54220

(51) Int. Cl.
*H04L 9/08*  (2006.01)
*H04W 12/06*  (2009.01)
*H04L 9/32*  (2006.01)

(52) U.S. Cl.
CPC .............. *H04W 12/06* (2013.01); *H04L 9/321* (2013.01)
USPC ............................... 713/155; 380/44; 726/10

(58) Field of Classification Search
CPC ......... H04L 9/321; H04L 9/3213; H04L 9/32; H04L 9/3202; H04L 63/08; H04L 63/0807
USPC .......................................................... 713/155
See application file for complete search history.

(56) References Cited

U.S. PATENT DOCUMENTS 5,590,199 A   12/1996  Krajewski, Jr. et al.
7,024,692 B1   4/2006  Schanze et al.

OTHER PUBLICATIONS

Boyd et al. "Key Establishment Protocols for Secure Mobile Communications: A Critical Survey." Computer Communications, Elsevier Science Publishers BV, vol. 23, No. 5-6, Mar. 1, 2000, pp. 575-587.

(Continued)

*Primary Examiner* — Andrew Nalven
*Assistant Examiner* — Khang Do
(74) *Attorney, Agent, or Firm* — Knobbe, Martens, Olson & Bear LLP (57) ABSTRACT

A method for secure communications in a telecommunications network is disclosed. The network comprises a group of servers $S_i$, referred to as Authorization Servers. For a transaction between an entity A and an entity B of this method comprises: a) entity A sends to one of the Authorization Servers $S_i$ an authorization request; b) the entity A declares to the Authorization Server $S_i$ its intention to communicate with entity B and the Authorization Server $S_i$ determines an individual secret key $K_{SiB}$ which it shares with entity B; c) the Authorization Server $S_i$ generates a session key $K_{N,Si}^{AB}$ and sends the session key $K_{N,Si}^{AB}$ to entity A; d) the Authorization Server $S_i$ generates a transaction identifier $IDTR_{N,Si}$; e) the authorization server $S_i$ supplies entity B the transaction identifier $IDTR_{N,Si}$; f) using this transaction identifier $IDTR_{N,Si}$, entity B checks the validity of the transaction, and g) entity B generates the session key $K_{N,Si}^{AB}$.

17 Claims, 3 Drawing Sheets

(56) References Cited

OTHER PUBLICATIONS

Huang, Chun-Ching Andy, "Using Identity-Based Privacy-Protected Access Control Filter (IPACF) to Against Denial of Service Attacks and Protect User Privacy" Thesis submitted to the Graduate Faculty of Auburn University, Aug. 7, 2007, pp. 1-75.

Neuman et al. "Kerberos: An Authentication Service for Computer Networks", IEEE Communications Magazine, IEEE Service Center, Piscataway, US vol. 32, No. 9, 1994 pp. 33-38.

International Search Report and Written Opinion dated Sep. 8, 2011, received in International Application No. PCT/FR2011/051200 (corresponds to above-captioned application).

METHOD AND DEVICES FOR SECURE COMMUNICATIONS IN A TELECOMMUNICATIONS NETWORK

This application is a national stage application under 35 U.S.C. §371, claiming priority to International Application No. PCT/FR2011/051200, having an international filing date of May 26, 2011, and published as International Publication No. WO 2011/151573 A1, which claims priority to French Patent Application No. 1054220, filed on May 31, 2010, each of which is incorporated by reference herein in its entirety and for all purposes.

The present invention relates to the securing of communications in a telecommunications network.

Telecommunications networks, such as the Internet, transmit data between different network entities, such as a web server or an electronic messaging server, via a common infrastructure. The invention can be applied, for example, to the secure access of a network entity to a service platform.

The invention can also be applied, for example, to the transmission of an "original message" from one network entity to one or more other network entities; "original message" is understood here to mean a set of any information, for example an e-mail, or a VoIP (initials of the English words "Voice over Internet Protocol" or "Voice over IP") call initiation request. In general terms, an original message is sent by a "dispatching client" attached to a "dispatching" domain and connected to a "transmitting" domain, to a "recipient client" attached to a "recipient" domain and connected to a "receiving" domain (in the context of the present invention, an entity is said to be "attached" to a network domain when this entity has a service link and/or a logical and/or administrative link to this domain; in the case of e-mail, the logical address corresponds to the "e-mail" address). The transmitting domain may or may not be different from the dispatching domain, and the receiving domain may or may not be different from the recipient domain; this distinction between domains is useful, for example, when a transmitting domain relays to a recipient client a message transmitted by a mobile dispatching client which is connected to this transmitting domain, but which is not attached to the transmitting domain.

As is well known, telecommunications networks are subjected to attacks aimed at business, administrative or individual targets. A commonly occurring attack currently consists in sending to the largest possible number of recipients undesirable messages which they have not solicited, such as "spam" for e-mails or "spit" for telephone calls over the Internet. The adjective "undesirable" is taken in the broadest sense and applies both to the identity of the dispatcher of the message, who may be authentic or falsified, and to the content of the message.

The possibility of spam/spit attacks is based notably on the following factors:
the weakness of the protocols used on the Internet, such as the SMTP ("Simple Mail Transfer Protocol") protocol which is most commonly used for e-mail transfer and does not notably incorporate functions for authenticating the sender of an e-mail;
the increase in the power of the computers which can send undesirable messages en masse automatically over a very short period; and
the increase in the number of networks having access to the Internet and in the connectivity between these networks, which presents a very large number of targets to attackers who can shelter behind relatively permissive networks or outside the legal or administrative range of the target networks.

Furthermore, it is not easy for a transmitting domain of the "transmitting.fr" type to determine whether an address of the user@dispalching.fr type provided by a mobile dispatching client connected to this transmitting domain is valid, i.e. if the address of this client is actually allocated in the "expediteur.fr" domain and if this client has the rights to send a message from this address: in fact, the transmitting domain does not manage the identities, i.e. the logical addresses of the "dispatching.fr" type. This monitoring difficulty is often used by attackers to transmit messages under a false identity from a domain to which the attackers have access, or via a corrupted machine located in a legitimate domain. For example, an Internet domain "domain.fr" created by an attacker may entirely be used to transmit VoIP calls with a calling identity +332abcdefqh@domain.fr, while in fact the subscriber number "+332abcdefgh" is allocated, for example, to the domain "orange.fr". Faced with this type of attack, the fact of adding a digital signature by the calling domain (cf. document RFC 4474 of the IETF) is ineffective because, if this guarantees to the recipient that the call in fact originates from "domain.fr", this does not guarantee to him that the calling number is actually registered in this domain.

One solution to this monitoring difficulty consists in blocking, in the transmitting domain, the dispatch of any message whose original address is not attached to the transmitting domain, but this solution is too limiting, notably for the mobility of the VoIP services which allow a mobile terminal to use a third-party relay such as a transmitting domain to set up a telephone call. This situation poses the problem of finding means allowing a recipient domain to make sure that sufficient checks have been carried out in the domain transmitting the message.

In the context of the present invention, "transaction" will refer to all of the protocol exchanges allowing the setting up of a shared secret or "primary session key" between two network entities A and B for the duration of a session. The transaction corresponds to the session initialization phase, this session being able to last much longer than the transaction. In certain parts of the description, the terms transaction and session may be considered as equivalent to one another. For the sake of simplification, the primary session key will also be referred to as the "session key" between A and B, independently of the derivation or diversification operations which may be applied to it. This session key may, for example, be used for the derivation of other secret keys to establish a secure connection (TLS, IPSec, or other) between the entities A and B. As another example, this session key may guarantee the confidentiality or integrity of an original message sent by the entity A (dispatching client) to the entity B (recipient client); a new transaction corresponds to each new original message sent from a dispatching client to one or more recipient clients; conversely, the repetition of a protocol step, for example due to a network problem, is not considered as a new transaction.

One network entity may obviously, in principle, authenticate another network entity by means of a PKI ("Public Key Infrastructure"). However, as is well known, PKI infrastructures are difficult to implement and use.

Alternatively, certain methods, such as the Diffie-Hellman algorithm, provide for the common determination of a session key by two entities prior to any exchange of original messages between them. However, an algorithm of this type does not in itself give an entity A any guarantee concerning the identity of an entity B with which it thus establishes a session key.

Alternatively, in networks comprising a small number of users, such as peer networks, a "manual" installation (for example by on-site visit) of a shared secret key for each pair of entities concerned may be provided for. However, an installation of this type is not suitable for networks comprising a large number of users.

A secure communications protocol is also known under the name of "IPACF" (see the article entitled "Using Identity-Based Privacy-Protected Access Control Filter (IPACF) to Against Denial of Service Attacks and Protect User Privacy", by C.-H. Wu et al., http://portal.acm.org/citation.cfm?id-1404806, 2007). This protocol is intended for an architecture comprising a set of entities A which can all communicate in a secure manner with a single entity B; in practice, the entities A are clients and the single entity B is an access control entity or server. A different shared secret exists between B and each of the entities A.

The IPACF protocol comprises three phases: an initial configuration phase allowing the implementation of shared secrets, an authentication phase during the setting up of a new session, and finally the secure communication phase itself. During this secure communication phase, an entity A sends a frame containing a user identifier (which is a function of the shared secret and a frame number), and also a filtering value (also a function of the shared secret and the frame number). The entity B checks whether the received identifier is valid in relation to all of the possible identifiers for all of the entities A at a given time; if necessary, the entity B checks the filtering value for the identified entity A. The same principle applies when B sends a frame to A. For each received frame, the entity A and the entity B update their identifier and filtering values.

The IPACF protocol offers effective protection against attacks by flooding, since any frame received by A or B not associated with a valid identifier and filtering value is rejected. This check is a simple matter for the receiver, since it involves a comparison with pre-calculated values. Furthermore, this protocol offers effective protection against replay, since the identifier and filtering values change with each frame.

However, the IPACF protocol has certain disadvantages. First of all, the mechanism is sensitive to frame losses, since every frame transmitted by A must have a corresponding frame transmitted by B; this disadvantage is notably troublesome in the case of a transport protocol in non-connected mode, where the signaling packets can arrive in any order, and may possibly be lost en route. Secondly, the mechanism is "asymmetrical" in the sense that each entity A can only communicate with an entity B with which it has a shared secret; thus, it is not possible to envisage direct secure communications between two user entities A.

A "symmetrical" mechanism well suited to networks comprising a large number of users involves implementing a trust centre, commonly referred to as a "key distribution centre". Each network entity A wishing to make use of this secure communications service subscribes with the Key Distribution Centre and consequently obtains, for a predetermined duration or for a predetermined transaction, a secret key $K_{SA}$ shared between A and an Authorization Server S associated with the Key Distribution Centre. Advantageously, the subscribers to this service do not have to store secrets or certificates concerning the other subscribers, the securing of the communications taking place on a transaction by transaction basis with the participation of the Key Distribution Centre. Furthermore, the Key Distribution Centre may, according to requirements, transmit secret keys in a secure manner to support entities (storage, gateways, etc.) placed under its control, or to legal entities for interception of certain communications. As the Key Distribution Centre is the repository of all secret keys of the subscribers, it is obviously indispensable that it is strongly protected against hostile intrusions, but this does not present a particular difficulty.

The article entitled "*IDDR-CEP: Inter-Domain and DoS-Resistent Call Establishment Protocol*" by P. Battistello (submitted for the IPTComm 2010 conference) discloses a secure communications protocol of this type between two entities A and B subscribing to the service. The IDDR-CEP protocol essentially comprises the following steps:

a) the entity A sends to an Authorization Server S an authorization request in which the entity A identifies itself and authenticates itself as the holder of an identifier $ID_A$;

b) the entity A declares to the Authorization Server S its intention to communicate with a certain entity B; the Authorization Server S determines a secret key $K_{SB}$ which it shares with this entity B;

c) the Authorization Server S generates a session key $K_N^{AB}$, said session key $K_N^{AB}$ being a one-way function of said secret key $K_{SB}$ and also being a function of an integer N, referred to as the transaction number, allocated to said transaction; then the Authorization Server S sends said session key $K_N^{AB}$ to the entity A;

d) the Authorization Server S also generates a "filtering value" $IDTR_N$, which is a function dependent at least on said transaction number N in a non-invertible manner;

e) the Authorization Server S supplies the entity B with elements comprising at least said filtering value $IDTR_N$;

f) the entity B checks that the filtering value $IDTR_N$ received during said step e) appears within a set of values pre-calculated by the entity B and associated with at least one predicted value of the transaction number, then infers from it the current value of the transaction number N; and g) the entity B generates the session key KB.

The entity A can then complete the transaction with the entity B. For example, if the entity B is a service provider, the entity A will be able to request a particular service and obtain it by exchanging data encrypted by means of the session key $K_N^{AB}$ with the entity B. As another example, if the entity B is waiting for a document from the entity A, the latter will be able to send to the entity B an original message accompanied with the "MAC" code of this original message obtained by means of the session key $K_N^{AB}$ (it must be remembered in this respect that, in a conventional manner, a "Message Authentication Code" or "MAC" in English is a short value—generally a few tens of bits—inferred from the data contained in a message and from a secret key shared between the transmitter and receiver of the message using a cryptographic algorithm; by sending a message accompanied with its authentication code, the transmitter allows the receiver to check that these data do not originate from a different entity and have not been altered between their transmission and reception).

The aforementioned advantages of the secure communications methods of the "Key Distribution Centre" type are thus exploited. Notably, a check on the authenticity of any entity subscribing to the secure communications service is imposed before it addresses another subscribing entity in order to offer security guarantees to this other entity.

Moreover, according to the IDDR-CEP protocol, the entity B receives, during step e) above, the filtering value $IDTR_N$ from the Authorization Server S. Moreover, the entity B calculates the filtering value $IDTR_N$ for at least one value N of the transaction number, this value being predicted to follow on, according to a predetermined algorithm, from a value used in a preceding transaction. When a plurality of transactions have been authorized over a short period by the Authorization Server S for the same entity B, it may occur that the elements sent to this entity B during said step e) do not reach it in the order of the transaction numbers N prescribed by the algorithm. To resolve this problem, the IDDR-CEP protocol provides that, preferably, the entity B pre-calculates the filtering value $IDTR_N$ for a predetermined sequence of a plurality of values of the integer N, and that, following reception of a certain filtering value $IDTR_N$, the entity B identifies, by scanning in this set of values of $IDTR_N$, the transaction number N to which the received filtering value corresponds.

It must be noted that the value of $IDTR_N$ is a function dependent at least on the integer N in a non-invertible manner, in such a way that it is not possible to calculate the value of the integer N from the value of $IDTR_N$ by inverting this function, nor to calculate any one of the values $IDTR_{N+i}$ (i>0) by knowing all or part of the preceding values $IDTR_{N-j}$ (j≥0).

Thanks to these measures, the entities subscribing to the secure communications service are advantageously protected against attacks by flooding or by replay. In fact, the entity B detects such an attack with ease (i.e. with few computing operations) when it recognizes that a value received and deemed to represent a valid filtering value $IDTR_N$ does not appear within said set of pre-calculated values (an attacker has an infinitesimal chance of guessing a value of the transaction number N acceptable at a given time by a given entity B, in such a way that this attacker cannot calculate an acceptable value of $IDTR_N$, even if the manner in which the filtering value $IDTR_N$ is a function of N is made public).

Moreover, the size (in number of bits) of the protocol messages in the IDDR-CEP protocol is advantageously small. In fact, on the one hand, neither the Authorization Server S nor the entity A has to send the session key $K_N^{AB}$ to the entity B. Moreover, the transmission of the filtering value $IDTR_N$ from the Authorization Server S to the entity B during step e) above does not require any large-size message(s) either, since the filtering value $IDTR_N$ can be a function of modest size (typically, a few bytes), while offering good security in cryptographic terms.

The IDDR-CEP protocol therefore provides for the implementation of an Authorization Server S. In many practical cases, it is however desirable to have a plurality of Authorization Servers $S_i$ (where i=1, 2, ..., p), rather than a single Authorization Server. This may involve, for example:

redundancy requirements; the entities $S_i$ and B typically belong to the same domain or network, and the number of entities $S_i$ is limited to a few units in such a way as to ensure load sharing or redundancy in the event of malfunction; and/or service requirements: the entities $S_i$ and B typically all belong to different domains; for example the entity B is the incoming proxy of the domain "orange.fr", and each entity $S_i$ is an outgoing proxy of a third-party domain which is able to transmit messages to the domain orange.fr.

However, in order to be able to achieve this objective of multiple Authorization Servers, it must be possible to resolve a whole range of problems:

the entity B must know which of the Authorization Servers $S_i$ manages the current transaction because, as in the IDDR-CEP protocol, it is highly desirable for the authentication of the entity A to be the responsibility of an Authorization Server; consequently, in order to defend itself against attacks through identity theft, B must be able to authenticate this Authorization Server, i.e. identify it (among the p servers of the group) in a secure manner;

except in particular cases (small group of Authorization Servers belonging to the same domain), any one of the Authentication Servers in the group must be prevented from discovering the secret elements used by any other Authorization Server of the group;

it is highly desirable for any number k of different Authorization Servers $S_i$ to be authorized to manage k transactions all having the transaction number N, in order to avoid the Authorization Servers $S_i$ of the group being obliged to coordinate themselves in such a way that, for all of the group, there can only be a single possible transaction associated with a given transaction number N; then, however, by way of security, and for legal reasons (seizure), it must not be possible for two transactions with the same transaction number N managed by different Authorization Servers to generate the same session key;

it is highly desirable for the size of the protocol messages to be sufficiently small to allow the use of a non-connected transport mode (for example, associated with the SIP signaling protocol), in which the nominal size of the signaling messages prevents the insertion of large-size data; and it is highly desirable for the protocol to easily accommodate expansion ("scalability") if a large number of entities $S_i$ (for example, several hundred) are to be authorized to manage transactions involving the same entity B.

The present invention therefore relates to a method for secure communications in a telecommunications network, said network comprising a group of servers $S_i$ (where i=1, 2, ..., p, and p is a strictly positive integer), referred to as Authorization Servers. For a transaction between an entity A and an entity B of said network, this method comprises the following steps:

a) the entity A sends to one of the Authorization Servers $S_i$ an authorization request in which the entity A identifies and authenticates itself as the holder of an identifier $ID_A$;

b) the entity A declares to said Authorization Server $S_i$ its intention to communicate with the entity B; the Authorization Server $S_i$ determines an individual secret key $K_{SiB}$ which it shares with this entity B;

c) the Authorization Server $S_i$ generates a session key $K_{N,Si}^{AB}$ which is a one-way function of said individual secret key $K_{SiB}$, and is also a function of an integer N, referred to as the transaction number, allocated to said transaction; the Authorization Server $S_i$ sends said session key $K_{N,Si}^{AB}$ to the entity A;

d) the Authorization Server $S_i$ also generates a filtering value $IDTR_N$, which is a function depending at least on said transaction number N in a non-invertible manner; it then generates a transaction identifier $IDTR_{N,Si}$, which is a function of said filtering value $IDTR_N$, of said individual secret key $K_{SiB}$, and of an identifier $ID_{Si}$ of this Authorization Server $S_i$;

e) the Authorization Server $S_i$ supplies the entity B with elements comprising at least said transaction identifier $IDTR_{N,Si}$;

f) using the transaction identifier $IDTR_{N,Si}$ received during said step e), the entity B:

identifies the current filtering value $IDTR_N$ within a set of filtering values pre-calculated by the entity B and associated with at least one predicted value of the transaction number, and obtains the Authorization Server identifier $ID_{Si}$, and from it infers the corresponding individual secret key $K_{SiB}$; and g) the entity B generates the session key $K_{N,Si}^{AB}$.

It is clear that step b) does not necessarily take place after step a). Likewise, step d) does not necessarily take place after step c).

It will be noted that the invention applies to any number of Authorization Servers (including a single one), but it is particularly advantageous when the number of Authorization Servers p is high.

It will also be noted that the evaluation of the authenticity of the entity A can be carried out by any known authentication means. Furthermore, this evaluation can be carried out by previously addressing an Authentication Server different from the Authorization Server $S_i$.

It will also be noted that, in practice, and for cryptographic separation requirements, it is not necessarily the (primary) session key $K_{N,Si}^{AB}$ that will be used for encrypting exchanges between the entities A and B, but, if necessary, one or more keys derived from $K_{N,Si}^{AB}$. For the sake of simplification, the keys derived from a primary key will not be systematically explained in the present document, but a derivation or diversification operation according to the prior art will be implicit while the same shared secret serves to implement a plurality of cryptographic functions.

According to the invention, an Authorization Server $S_i$ therefore determines a transaction number N for a new transaction having a certain entity B as recipient. The Authorization Server $S_i$ then supplies a session key $K_{N,Si}^{AB}$ to the entity A. As in the IDDR-CEP protocol, the entity B itself has means to calculate this session key; according to the present invention, the entity B uses an individual secret key $K_{SiB}$ to do this, and also the current transaction number N, of which the entity B determines the value after receiving a "transaction identifier" $IDTR_{N,Si}$ originating from the Authorization Server $S_i$, either directly or via a different entity, which may advantageously be the entity A (cf. the embodiments described in detail below).

Each Authorization Server $S_i$ determines the successive transaction numbers N relating to a given entity B according to a predetermined algorithm (examples of which will be given below). The entity B pre-calculates a "filtering value" $IDTR_N$ for at least one value of the transaction number N. For the same reasons as in the IDDR-CEP protocol, the entity B preferably pre-calculates the filtering values $IDTR_N$ for a plurality of predicted values of the transaction number N (which, in the context of the present invention, will be referred to as a "transaction window"). It will be noted in this respect that the Authorization Servers $S_i$ do not, for their part, need to manage any transaction windows. It will also be noted that the transaction number sequence used, in accordance with said algorithm, by a given Authorization Server $S_i$ for a given entity B is (except through particular arrangement) independent from the transaction number sequence used by the same Authorization Server $S_i$ for a different entity B; consequently, the transaction windows used by the various entities B are (except through particular arrangement) mutually independent.

The transaction identifier $IDTR_{N,Si}$ is a function of the filtering value $IDTR_N$, of the individual secret key $K_{SiB}$, and of an identifier $ID_{Si}$ of this Authorization Server $S_i$. As will be explained in detail below, the entity B, after receiving the transaction identifier $IDTR_{N,Si}$, obtains the current filtering value $IDTR_N$ by scanning in all of said pre-calculated filtering values associated with the current transaction window. The entity B then infers the identifier $ID_{Si}$ therefrom. It will be noted that, contrary to the IDDR-CEP protocol, the filtering value $IDTR_N$ is not transmitted to the entity B in unencrypted form, but in a form more or less partially masked (cf. example embodiments below) in order to prevent an attacker (other than a corrupted Authorization Server different from the present Authorization Server $S_i$) from being able to obtain the identifier $ID_{Si}$ of the Authorization Server $S_i$ on the basis of the transaction identifier $IDTR_{N,Si}$ and of the filtering value $IDTR_N$.

The entity B can then detect an attack with ease, i.e. with few computing operations, when it recognizes:
that the value of the received transaction identifier $IDTR_{N,Si}$ is not compatible with any of the pre-calculated filtering values $IDTR_N$, or
that the inferred value $ID_{Si}$ is not the identifier of any of the Authorization Servers in the group, or
that this Authorization Server $S_i$ has already authorized a preceding transaction with the same number N for the entity B.

The invention therefore advantageously offers (as did the IDDR-CEP protocol, albeit with different means) excellent protection of the entities subscribing to the secure communications service against attacks by flooding or replay.

The present invention also maintains the IDDR-CEP property relating to the small size of the protocol messages. In fact, on the one hand, neither the Authorization Server $S_i$ nor the entity A has to send the session key $K_{N,Si}^{AB}$ to the entity B; on the other hand, the (direct or indirect) transmission of the transaction identifier $IDTR_{N,Si}$ to the entity B during step e) above does not require any large-size message(s), since the transaction identifier $IDTR_{N,Si}$ can be a function of modest size (typically, a few tens of bytes), while offering good security in cryptographic terms.

According to particular characteristics, the entity B checks, during step f) above, that the value of the received transaction identifier $IDTR_{N,Si}$ is consistent with the individual secret key $K_{SiB}$.

Thanks to these measures, the entity B can authenticate the Authorization Server $S_i$ which is deemed to have authorized the current transaction.

According to other particular characteristics, said Authorization Servers use an algorithm common to all of the Authorization Servers in said group in order to determine the successive transaction numbers N relating to a given entity B.

Thanks to these measures, each entity B manages only a single transaction window (as defined above), regardless of the number of Authorization Servers in said group. The management task of the entity B is therefore substantially simplified, and all the more so when the number p of Authorization Servers is high.

Under these conditions, the Authorization Servers in the group share a common transaction window with any given entity B. These Authorization Servers can receive, a priori, requests asking for authorization to communicate with this entity B with a reception speed which differs totally from one Authorization Server to another. A synchronization mechanism will therefore preferably be provided, which is intended to guarantee that the transaction numbers N determined by the various Authorization Servers fall, under normal operating conditions, within the transaction window managed by the entity B, and that, conversely, the transaction window managed by the entity B "slides" in concert with the Authorization Server $S_i$ having the highest transaction speed.

According to a first variant (which will be referred to below as "clock-based synchronization"), the transaction number N determined, for a given entity B, by any given Authorization Server $S_i$ at a given time $t_d$, is a predetermined function of this time $t_d$ and of a reference number $N_B$, the value of which is a secret shared by the entity B and by all of the Authorization Servers in the group.

Thanks to these measures, the width of the transaction window managed by the entity B at a given time $t_d$ must reflect only the uncertainty at the corresponding time $t_r$ at which the entity B receives the elements which the Authorization Server $S_i$ has supplied to it in accordance with step e) of the method according to the invention. This uncertainty results, on the one hand, from the (as mentioned, direct or indirect) transmission delays of these elements and, on the other hand, from the technical limitations in the synchronization of the respective internal clocks of the entity B and of the Authorization Server $S_i$. All in all, this uncertainty, and therefore the width of the transaction window, is normally quite insubstantial, so that the number of filtering values which an entity B must pre-calculate is advantageously small.

The value of the reference number $N_B$ is preferably updated periodically by means of a predetermined one-way function.

This first variant then essentially has the property referred to as "Forward Secrecy", i.e. the property according to which the long-term compromising of secrets (private key or shared secret) must not allow an attacker to reconstruct the session keys preceding this compromising. It is possible to check that this is the case in this instance, even when the attacker is a corrupted Authorization Server. In fact, if an attacker succeeds in compromising an Authorization Server $S_i$, he will have access to its individual secret key $K_{SiB}$, and also to the current value of the transaction number N, allowing him to calculate the session key $K_{N,Si}^{AB}$ associated with the current transaction and to the following transactions managed by this corrupted Authorization Server $S_i$. However, as the updating of the reference number $N_B$ is carried out by means of a one-way function, this attacker will not have access to the values of the transaction number N prior to the last update. It is therefore possible, according to the period chosen for updating the reference number $N_B$, to adjust the security offered by the system, i.e. the preceding duration during which the "Forward Secrecy" property is not ensured in the event of compromise.

According to a second variant (which will be referred to below as "network-message-based synchronization"), the transaction number N determined, for a given entity B, by any given Authorization Server $S_i$ is a predetermined sequencing function of the preceding transaction number, and this Authorization Server $S_i$ sends a synchronization message to the entity B each time the Authorization Server $S_i$ determines a value of the transaction number belonging to a series of predetermined values for the entity B.

Thanks to these measures, the entity B, which receives synchronization messages of this type from each of the Authorization Servers in the group, can then adjust its transaction window according to the last transaction number N determined by the Authorization Server $S_i$ having the highest transaction speed. Moreover, this entity B can send synchronization messages to all of the Authorization Servers in the group so that the Authorization Servers having the slowest transaction speeds can consequently update their current transaction number.

In this second variant, the sequence of the transaction numbers N may simply be the ascending order of the natural integers, but a one-way function will preferably be chosen for said sequencing function; in fact, this second variant will then advantageously have the "Forward Secrecy" property mentioned above.

According to other particular characteristics, all or part of said elements sent to the entity B during step e) above are protected in their integrity.

Thanks to these measures, these elements are protected against any corruption; a corruption of this type would cause the transaction to fail in most cases. This integrity protection can notably be implemented by means of a MAC code.

According to even more particular characteristics, this integrity protection is implemented by means of said session key $K_{N,Si}^{AB}$ or a key derived from this session key $K_{N,Si}^{AB}$.

Thanks to these measures, the entity B will be able to make sure that the entity which has sent it elements comprising a valid transaction identifier $IDTR_{N,Si}$ does indeed have the session key $K_{N,Si}^{AB}$ associated with the current transaction. These measures also allow the transaction identifiers $IDTR_{N,Si}$ to be addressed to the entity B in unencrypted form for the sake of simplicity.

According to further particular characteristics, said elements which the Authorization Server $S_i$ supplies to the entity B during step e) above also comprise a datum $CHECK_{N,Si}^{AB}$ dependent on the transaction number N and inferred, by means of a cryptographic function dependent on a secret key $K_{SiB,check}$ derived from said secret key $K_{SiB}$, from a set of elements obtained from said authorization request and, optionally, from the transaction number N.

Thanks to these measures, the Authorization Server $S_i$ can prove to the entity B that it has indeed authorized the transaction and indicate to it the information which it has used to do so.

According to further particular characteristics, the entity A supplies the entity B with said identifier $ID_A$ of the entity A, or a derived identifier $ID'_A$ used, for example, for anonymity requirements.

Thanks to these measures, the entity B is informed of the identity of the entity A which initiated with it the transaction of number N.

According to even more particular characteristics:
said set of elements from which said datum $CHECK_{N,Si}^{AB}$ is inferred comprises the identifier $ID_A$ of the entity A or said derived identifier $ID'_A$, and during said step f), the entity B checks, by means of said secret key $K_{SiB,check}$, the consistency between, on the one hand, the datum $CHECK_{N,Si}^{AB}$ received (directly or indirectly) from the Authorization Server $S_i$ as succinctly described above, and, on the other hand, said elements comprising the identifier $ID_A$ or derived identifier $ID'_A$ received from the entity A, as succinctly described above.

Thanks to these measures, the entity B can check that the entity A which addresses it has indeed been authorized by the Authorization Server $S_i$ under the same identity $ID_A$ or $ID'_A$. The entity B is thus protected against identity theft ("phishing").

Correlatively, the invention relates to various devices.

Firstly, it also relates to a device, referred to as the Authorization Server, for securing communications in a telecommunications network during a transaction between an entity A and an entity B, comprising means for:

identifying and authenticating an entity A holding an identifier $ID_A$, determining an individual secret key $K_{SiB}$ which said Authorization Server $S_i$ (where i=1, 2, ..., p, and p is a strictly positive integer) shares with an entity B with which the entity A declares its intention of communicating, generating a session key $K_{N,Si}^{AB}$ and sending it to the entity A, said session key $K_{N,Si}^{AB}$ being a one-way function of said individual secret key $K_{SiB}$ and also being a function of an integer N, referred to as the transaction number, allocated to said transaction, generating a filtering value $IDTR_N$, which is a function dependent at least on said transaction number N in a non-invertible manner, generating a transaction identifier $IDTR_{N,Si}$, which is a function of said filtering value $IDTR_N$, of said individual secret key $K_{SiB}$, and of an identifier $ID_{Si}$ of this Authorization Server $S_i$, and supplying said entity B with elements comprising at least said transaction identifier $IDTR_{N,Si}$.

Secondly, it also relates to a device, referred to as entity B, for secure communications in a telecommunications network, characterized in that it comprises means, during a transaction involving said entity B and an entity A, for:

receiving elements comprising at least a transaction identifier $IDTR_{N,Si}$ generated by an Authorization Server $S_i$ (where i=1, 2, . . . , p, and p is a strictly positive integer), said transaction identifier $IDTR_{N,Si}$ being a function of a filtering value $IDTR_N$, of an individual secret key $K_{SiB}$ shared by the entity B and said Authorization Server $S_i$, and of an identifier $ID_{Si}$ of this Authorization Server $S_i$, and said filtering value $IDTR_N$ being a function dependent at least, in a non-invertible manner, on an integer N, referred to as the transaction number, allocated to said transaction, with the aid of said transaction identifier $IDTR_{N,Si}$, identifying the current filtering value $IDTR_N$ within a set of filtering values pre-calculated by the entity B and associated with at least one predicted value of the transaction number, and obtaining the Authorization Server identifier $ID_{Si}$, and from it inferring the corresponding individual secret key $K_{SiB}$; and generating a session key $K_{N,Si}^{AB}$ which is, on the one hand, a function of said transaction number N, and, on the other hand, a one-way function of said individual secret key $K_{SiB}$.

According to particular characteristics, said entity B furthermore comprises a correspondence table correlating at least one predicted value of the transaction number with the associated pre-calculated filtering value.

Thanks to these measures (cf. embodiments below), the entity B can easily, through simple scanning of this correspondence table, infer the current filtering value of the received transaction identifier, then read the value of the transaction number associated with this current filtering value. Conversely, the entity B can easily, through simple scanning of this correspondence table, read the filtering value associated with the current transaction number, which the entity B has previously inferred from the received transaction identifier.

Thirdly, the invention also relates to a device, referred to as entity A, for secure communications in a telecommunications network, comprising means, during a transaction involving said entity A and an entity B, for:

identifying itself and authenticating itself as the holder of an identifier $ID_A$ vis-à-vis an Authorization Server $S_i$ (where i=1, 2, . . . , p, and p is a strictly positive integer), declaring to said Authorization Server $S_i$ its intention to communicate with a certain entity B, receiving a session key $K_{N,Si}^{AB}$ from the Authorization Server $S_i$, said session key $K_{N,Si}^{AB}$ being a one-way function of an individual secret key $K_{SiB}$ shared by the Authorization Server $S_i$ and said entity B, and also being a function of an integer N, referred to as the transaction number, allocated to said transaction, receiving a transaction identifier $IDTR_{N,Si}$ from the Authorization Server $S_i$, said transaction identifier $IDTR_{N,Si}$ being a function of a filtering value $IDTR_N$, of said individual secret key $K_{SiB}$, and of an identifier $ID_{Si}$ of this Authorization Server $S_i$, and said filtering value $IDTR_N$ being a function dependent at least, in a non-invertible manner, on said transaction number N, and sending elements comprising at least said transaction identifier $IDTR_{N,Si}$ to the entity B.

This third device is therefore associated with the embodiment of the invention, briefly mentioned above, in which the transmission of the transaction identifier $IDTR_{N,Si}$ from the Authorization Server $S_i$ to the entity B is relayed by the entity A.

The invention also relates to a device combining the means of the last two devices succinctly described above; such a device may act, according to circumstances, either as a dispatching entity A or as a recipient entity B.

The advantages offered by these devices are essentially the same as those offered by the correlative methods succinctly explained above.

It will be noted that it is possible to carry out the method for secure communications according to the invention by means of software instructions and/or by means of electronic circuits.

The invention therefore also relates to a computer program downloadable from a communications network and/or stored on a medium readable by computer and/or executable by a microprocessor. This computer program is noteworthy in that it comprises instructions for implementing said means comprised in any one of the secure communications devices succinctly described above.

The advantages offered by this computer program are essentially the same as those offered by said devices.

Other aspects and advantages of the invention will become evident from a reading of the detailed description below of particular embodiments, presented as non-limiting examples. The description refers to the figures which accompany it, in which.

Figure 1:
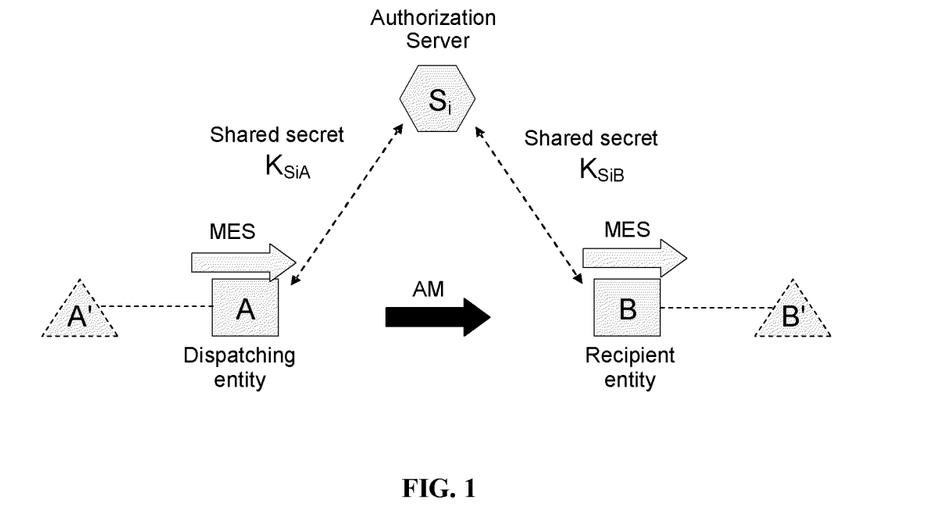
FIG. 1 shows schematically a telecommunications network and the main entities to which the invention applies.

The system shown in FIG. 1 comprises at least three entities interconnected via a communications network, for example an Internet network. The method is particularly advantageous in the case of a non-connected transport mode, but is also suitable for a connected transport mode.

The entities A and B subscribe to the same secure communications service. In a conventional manner, they each use a terminal or a server suitable for transmitting or receiving messages of any type such as, for example, e-mails or telephone calls on fixed or mobile channels. In the context of the present invention, it will be noted that, in order to simplify the explanation, the word "server" is used to designate uniformly any type of computing device, and not only computing devices conventionally designated under the name of "servers".

In practice, the entity A can play the part of a server or relay for an entity A' connected to the entity A; similarly, the entity B can play the part of a server or relay for an entity B' connected to the entity B.

The entity $S_i$ (where i=1, 2, . . . , p) is an "Authorization Server" (which may, naturally, be composed in practice of a plurality of physical servers) belonging to a group of p Authorization Servers. This entity $S_i$ allows a subscriber entity A to address a different subscriber entity B in a secure manner; moreover, it protects the entity B against the reception of undesirable messages. According to the applications and deployment scenarios (cf. examples below), the entity $S_i$ may be independent from the application domains or networks to which the entities A and B belong, or the entity $S_i$ may belong to the same application domain or network as the entity A and/or the entity B.

The Authorization Server $S_i$ takes into account a sequence of integral values, referred to as "transaction numbers", separately for each entity B. The transaction number N allows the ordering of the transactions in which the entity B participates, but which are initiated by a subscriber entity other than the entity B (or other than an entity for which, if necessary, the entity B acts as a server or relay). The sequence of the transaction numbers N for a given entity B is known only to this entity B and to the Authorization Server $S_i$ (or to all of the Authorization Servers in the group); furthermore, no transaction number is transmitted from one entity to another. Thanks to these measures, it is impossible for an attacker to find the current value of the transaction number relating to an entity subscribing to the secure communications service.

The transaction with transaction number N must be authorized by the Authorization Server $S_i$, following an authorization request transmitted by the entity A to $S_i$. In the event of approval, the Authorization Server $S_i$ responds to this authorization request by supplying the entity A with the information required to make contact with the entity B.

During each transaction, following an identification of the entity A, the Authorization Server $S_i$ determines a long-term secret key $K_{SiA}$ which it shares with this entity A. This long-term secret key $K_{SiA}$ allows the derivation of other secret keys which are used if required to ensure the integrity or confidentiality of the messages exchanged between A and S.

Similarly, a long-term shared secret $K_{SiB}$ exists between the entity B and each of the Authorization Servers $S_i$. This long-term secret key $K_{SiB}$ allows the derivation of other secret keys which are used if required to ensure the integrity or confidentiality of the messages exchanged (directly or indirectly) between $S_i$ and B.

For any transaction with number N, the entities $S_i$ and B, by using algorithms which may be public, are capable of independently generating a filtering value $IDTR_N$, which must be dependent at least on N and must be generated by means of an algorithm in such a way that, if one or more values $IDTR_N$ used in preceding transactions are known, the current value of N, or a value $IDTR_{N+i}$ (i>0) cannot be inferred therefrom.

The Authorization Server $S_i$ furthermore generates a transaction identifier $IDTR_{N,Si}$, which is a function of said filtering value $IDTR_N$, of said individual secret key $K_{SiB}$, and of an identifier $ID_{Si}$ of this Authorization Server $S_i$ Furthermore, by using algorithms which may be public, the entities $S_i$ and B are capable of independently generating the (primary) session key $K_{N,Si}^{AB}$ used between the entities A and B for the current transaction and session; this session key must depend at least on N and on $K_{SiB}$, and must be generated by means of an algorithm in such a way that, even if the value of $K_{N,Si}^{AB}$ and the value of N are known, the value of $K_{SiB}$ cannot be inferred therefrom.

In a conventional manner, the primary session (or transaction) key $K_{N,Si}^{AB}$ allows other secret keys to be derived which are used if required to ensure the integrity or the confidentiality of the messages exchanged between A and B.

The entity B preferably pre-calculates the filtering values $IDTR_N$ for a predetermined sequence of values of the integer N. In this case, the Authorization Servers $S_i$ in the group will all preferably use the same algorithm to determine the successive transaction numbers N relating to this entity B, in such a way that the entity B only has to manage a single transaction window.

Various algorithms can be chosen for this purpose, but the chosen algorithm must preferably incorporate a synchronization mechanism vis-à-vis the various Authorization Servers $S_i$ in order to minimize the width of the transaction window.

For example, in the case of "clock-based synchronization", the transaction number N determined, for a given entity B, by any given Authorization Server $S_i$ at a given time $t_d$ is a predetermined function of this time $t_d$ and of a reference number $N_B$, the value of which is a secret shared by the entity B and by all of the Authorization Servers $S_i$ in the group. The time $t_d$ is a time indication ("timestamp") evaluated with a predetermined precision, for example to the nearest second. As for the reference number $N_B$, its value is preferably updated periodically (for example, every 10 minutes) by means of a predetermined one-way function.

Furthermore, it is desirable in certain cases (for example for real-time applications) for an Authorization Server $S_i$ to be able to authorize a plurality of transactions during the same time unit t (corresponding to the predetermined precision). In this case, the transaction identifier $IDTR_{N,Si}$ and the session key $K_{N,Si}^{AB}$ will also be dependent on a sub-transaction number j. It can furthermore be provided that the number of sub-transactions per time unit which an Authorization Server $S_i$ can authorize cannot exceed a predetermined value $j_{max}$.

As a further example, in the case of "network-message-based synchronization", the transaction number N determined, for a given entity B, by any given Authorization Server $S_i$ is a predetermined sequencing function of the preceding transaction number, and this Authorization Server $S_i$ sends a synchronization message to the entity B each time that the Authorization Server $S_i$ determines, for the entity B, a value of the transaction number belonging to a series of predetermined values (for example every 10 transactions).

In this second variant, on the initialization of the system shown in FIG. 1, the entities $S_i$ in the group and B agree on an initial transaction number $N_B$, which preferably varies from one entity B to another. Then, with each transaction, the transaction number N is modified according to an algorithm which may be public; for example, N can be incremented by 1 with each new transaction, but this algorithm can also vary from one entity B to another, in which case it must be present in the secrets shared by the entities $S_i$ in the group and the entity B.

Figure 2:
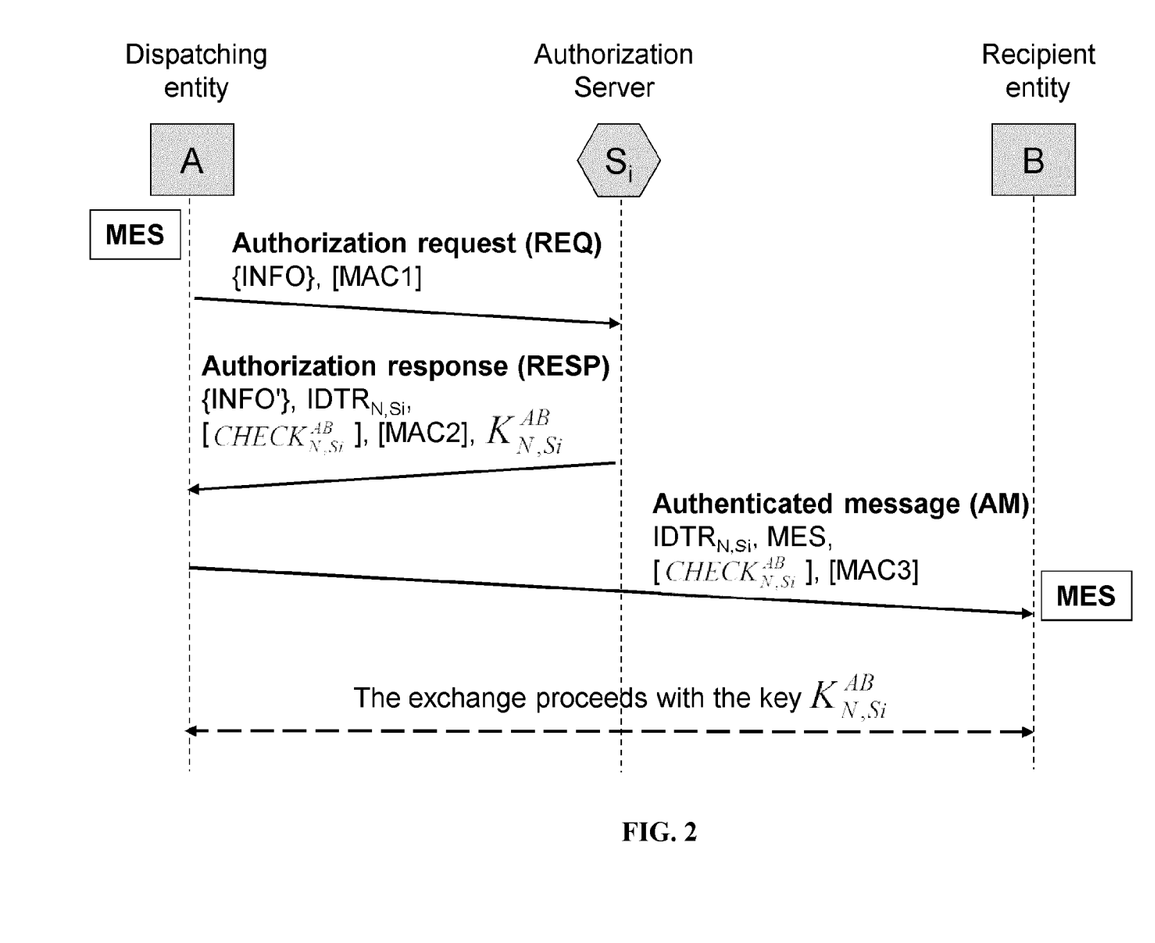
FIG. 2 shows schematically the steps of a method for secure communications according to a first embodiment of the invention.

FIG. 2 shows schematically the steps of a first embodiment of a method according to the invention, in which the transmission of the transaction identifier $IDTR_{N,Si}$ of the Authorization Server $S_i$ to the entity B is relayed by the entity A.

The main subject-matter of the present embodiment is the secure implementation of a session key $K_{N,Si}^{AB}$ between the entities A and B for the transaction with number N, the subsequent use (for example, confidential transmission of multimedia flows, or electronic payment) which the entities A and B of this session key $K_{N,Si}^{AB}$ will make during the session being independent from the invention.

For clarification, it will be assumed that an entity A, referred to as the "dispatching client", wishes to send an "original message" MES to one or more entities B, referred to as the "recipient client(s)". The main steps of this embodiment will now be explained.

During a first step E1, a new transaction is authenticated, and authorized, by an Authorization Server $S_i$ in the group.

More precisely, during a sub-step E1.1, the entity A initiates a transaction by sending an authorization request REQ to an Authorization Server $S_i$, with which it shares a secret key $K_{SiA}$. This authorization request REQ contains at least elements INFO allowing the Authorization Server $S_i$ to authenticate the entity A, these elements comprising at least an identifier $ID_A$ of this entity.

The authorization request REQ may furthermore contain information characterizing the message MES or allowing the entity B to be identified.

Finally, when the integrity of the exchanges between A and $S_i$ is not ensured by the underlying transport protocol, the authorization request REQ preferably contains an authentication code MAC1 calculated over all or part of the aforementioned elements of the request REQ. A secret key derived from the secret key $K_{SiA}$, which will be denoted as $K_{SiA,MAC1}$, will be used for this purpose.

It will also be noted, concerning the identities of the entities A and B, that:
- in some cases, the entity A does not completely know the identity of the recipient client of its original message MES; this identity is then determined by the Authorization Server $S_i$;
- in some cases, it is possible, for requirements of anonymity, for the identifier $ID_A$ of the entity A not to be revealed to the entity B, or for the entity A to ask the Authorization Server $S_i$ to present the entity A to the entity B under a "derived identifier" $ID'_A$; and
- where appropriate, according to the architecture concerned, the identities of A or B can be replaced or complemented by those of A' or B' (cf. the description of FIG. 1 above).

During a sub-step E1.2, on receiving the authorization request REQ, the Authorization Server $S_i$ decides, according to information contained in this request, to authorize or not to authorize the transaction.

If the received authorization request REQ is associated with an authentication code MAC1, the Authorization Server $S_i$ then checks the integrity of the relevant elements of the authorization request REQ.

If required, the Authorization Server $S_i$ determines the identity of the recipient client(s) B (or B'). Finally, the Authorization Server $S_i$ optionally checks any whitelists or blacklists of the entity B relative to the entity A, in the case where the entity B has declared, for example, that it refuses any transaction with this entity A in particular.

If the transaction is authorized, the Authorization Server $S_i$ then transmits an authorization response RESP containing at least the session key $K_{N,Si}^{AB}$ to the entity A, during a step E2.

When the confidentiality of the exchanges between the Authorization Server $S_i$ and the entity A is not ensured by the underlying transport protocol, the Authorization Server $S_i$ sends the session key $K_{N,Si}^{AB}$ in a confidential form to the entity A. This confidential form may, for example, be the result of the encryption of the session key $K_{N,Si}^{AB}$ by means of an algorithm using said secret key $K_{SiA}$ or a key derived from this secret key $K_{SiA}$. It will then be possible for the session key $K_{N,Si}^{AB}$ to be calculated by the entity A on the basis of this encrypted form by means of a decryption algorithm using the secret key $K_{SiA}$ or said key derived from the secret key $K_{SiA}$.

In this first embodiment, the Authorization Server $S_i$ also transmits a transaction identifier $IDTR_{N,Si}$ to the entity A, which will be responsible for retransmitting it to the entity B during the sub-step E3.2 described below.

It will be noted that it is optionally possible to transmit the transaction identifier $IDTR_{N,Si}$ in unencrypted form. Nevertheless, in the case where the confidentiality of the exchanges between the Authorization Server $S_i$ and the entity A is not ensured by the underlying transport protocol, if an attacker was capable of reading its value, he could very quickly send one or more invalid messages to the entity B in such a way that they are received by the entity B before the legitimate message transmitted by the entity A. The entity B would in fact detect such an attack, but only after having carried out additional checks (see below), since the value of the transaction identifier $IDTR_{N,Si}$ would appear to it to be correct. The entity B would therefore be exposed to a risk of attack by flooding. Also, in the case considered, the Authorization Server $S_i$ will send the transaction identifier $IDTR_{N,Si}$ to the entity A, preferably encrypted or masked in a known manner, by using the secret key $K_{SiA}$ or a secret key derived from this secret key $K_{SiA}$ for this purpose.

As mentioned above, the transaction identifier $IDTR_{N,Si}$ is a function of the filtering value $IDTR_N$, of the individual secret key $K_{SiB}$, and of an identifier $ID_{Si}$ of the Authorization Server $S_i$. Examples of the implementation of this function will now be given. In these examples:
- the filtering value $IDTR_N$ (for example, 16 bytes long) is made up of at least two logical parts, i.e. $V_0$ and $V_1$, where the length of $V_1$ is equal to that of $ID_{Si}$ (for example, 8 bytes),
- the transaction identifier $IDTR_{N,Si}$ is the concatenation of at least three parts, i.e. $P_0$, $P_1$ and $P_2$,
- the part $P_1$ is equal to $$P_1 = V_1 \text{ XOR } ID_{Si},$$

where the symbol "XOR" designates the bit-by-bit addition ("exclusive or" operation), and
- the part $P_2$ is equal to $$P_2 = HMAC(P_0 | P_1),$$

where the symbol "( . . . | . . . )" designates the concatenation, and where HMAC is a cryptographic function dependent on the individual secret key $K_{SiB}$.

Thus, the part $P_2$ allows the authentication in a cryptographic manner of the Authorization Server $S_i$, which was previously identified thanks to the value $ID_{Si}$ contained in $P_1$. Furthermore, the part $P_2$ protects the integrity of $P_0$ and $P_1$.

The part $P_1$ is obtained by masking a part V of the filtering value $IDTR_N$ by means of the identifier $ID_{Si}$. This identifier $ID_{Si}$ is constant over time, but since the filtering value $IDTR_N$ changes with each transaction, $P_1$ also changes with each transaction, in such a way that an attacker not knowing the transaction number N can neither predict the following values of $P_1$ nor obtain $ID_{Si}$ on the basis of $P_1$.

The reading of $P_1$ in step E4, described below, will allow the entity B, through the inverse operation of that which allowed $P_1$ to be calculated, to obtain the value $ID_{Si}$ contained in $P_1$, and to check the validity of the filtering value $IDTR_N$ and of the identifier $ID_{Si}$. This double check cannot be carried out simultaneously: in fact, the entity B must first infer the filtering value $IDTR_N$ of the received transaction identifier $IDTR_{N,Si}$.

The following relation, for example, can simply be taken for this purpose: $P_0 = V_0$. Thus, the entity B will compare the received part $P_0$ with the part $V_0$ of the values $IDTR_N$ pre-calculated for the current transaction window. This part $V_0$ of $IDTR_N$, which appears in unencrypted form in $IDTR_{N,Si}$, will be referred to as the "$IDTR_N$ leader".

However, in the case of clock-based synchronization, it is conceivable, for greater security, to mask $IDTR_N$ completely with $ID_{Si}$ in $P_1$. Thus, an attacker observing the exchanges would not see any part of $IDTR_N$ in unencrypted form. In this case, the "$IDTR_N$ leader" $V_0$ is empty, $V_1 = IDTR_N$, and it is necessary to supply the entity B with a different means to recover and check the validity of the filtering value. For example, it will be possible to take:

$$P_0 = t_d,$$

where, as previously mentioned, $t_d$ designates the timestamp; the entity B first calculates the transaction number N corresponding to this timestamp and checks that it actually appears in the current transaction window; then the entity B recovers the pre-calculated filtering value $IDTR_N$ corresponding to this transaction number value.

In the case, mentioned above, where clock-based synchronization is chosen and where the transactions are additionally characterized by a sub-transaction number j, the part $P_2$ of the transaction identifier $IDTR_{N,Si}$ will also depend on this sub-transaction number.

For checking purposes, the authorization response RESP may also contain a subset INFO' of the information INFO contained in the authorization request REQ.

The authorization response RESP may also contain a datum $CHECK_{N,Si}^{AB}$ dependent on the transaction number N and inferred, by means of a cryptographic function dependent on a secret key $K_{SiB,check}$ derived from said secret key $K_{SiB}$, from a set of elements obtained from said authorization request REQ and, optionally, from the transaction number N. It will be noted that, in order to do this, (at least) two variants are conceivable:
- according to a first variant, the variables to which said cryptographic function is applied comprise only elements obtained from said authorization request; in this case, it is necessary for the secret key $K_{SiB,check}$ to be a one-way function of the transaction number N (and of the secret key $K_{SiB}$);
- according to a second variant, the transaction number N is actually included in the variables to which said cryptographic function is applied; in this case, said secret key $K_{SiB,check}$ is not necessarily dependent on N, and must only be a one-way function of the secret key $K_{SiB}$.
- Furthermore, this cryptographic function will preferably be dependent on a random element generated simultaneously, during each transaction, by the Authorization Server $S_i$ and the entity B (this random element prevents a malicious entity A from finding the secret key $K_{SiB,check}$ through inversion of the datum $CHECK_{N,Si}^{AB}$).

As indicated above, it is possible to envisage applications of the invention in which the entity A is authorized to remain anonymous vis-à-vis the entity B; in this case (and possibly in other cases also), said elements obtained from the authorization request REQ, the encryption of which supplies the data $CHECK_{N,Si}^{AB}$ will not contain any identifier of the entity A, or will contain said derived identifier $ID'_A$ of the entity A.

Finally, when the integrity of the exchanges between A and $S_i$ is not ensured by the underlying transport protocol, the authorization response RESP preferably contains an authentication code MAC2 calculated over all or part of the aforementioned elements of the response RESP. A secret key derived from the secret key $K_{SiA}$, denoted as $K_{SiA,MAC2}$, will be used for this purpose.

During a step E3, the entity A receives the authorization response RESP from the Authorization Server $S_i$, and sends an "authenticated message" AM to the entity B.

More precisely, during a sub-step E3.1, following reception of the authorization response RESP, the entity A preferably carries out the following checks:
- if the received authorization response RESP contains data deemed to belong to a subset of the information contained in the authorization request REQ, the entity A checks that this information actually corresponds to an authorization request REQ previously transmitted by it; and
- if the received authorization response RESP is associated with an authentication code MAC2, the entity A checks the integrity of the relevant elements of the authorization response RESP.

If these checks are positive, the entity A, during a sub-step E3.2, extracts the session key $K_{N,Si}^{AB}$, the transaction identifier $IDTR_{N,Si}$, and, where appropriate, the datum $CHECK_{N,Si}^{AB}$ from the authorization response RESP. The entity A then sends an authenticated message AM to the entity B comprising the original message MES, the transaction identifier $IDTR_{N,Si}$, and, where appropriate, the datum $CHECK_{N,Si}^{AB}$.

When the integrity of the exchanges between A and B is not ensured by the underlying transport protocol, the authenticated message AM preferably contains an authentication code MAC3 calculated over all or part of the aforementioned elements of this message AM; the session key $K_{N,Si}^{AB}$ or a secret key $K_{N,Si,MAC3}^{AB}$ derived from the session key $K_{N,Si}^{AB}$ will advantageously be used for this purpose.

Except in cases where complete anonymity is required, the authenticated message AM will comprise the identifier $ID_A$ or the derived identifier $ID'_A$ of the entity A. This identifier will of course also be able to form part of said elements serving as a basis for calculating the authentication code MAC3.

It will be noted that, alternatively (cf. notably the architecture examples presented below), the authenticated message AM can be sent by an authorized entity other than the entity A itself, for example a different network server. The case in which the authenticated message AM is sent "directly" by the Authorization Server $S_i$ will be described below with reference to FIG. 3.

During a step E4, the entity B receives the authenticated message AM and determines the session key.

More precisely, during a sub-step E4.1, following reception of an authenticated message AM, the entity B, as explained above, obtains the current filtering value $IDTR_N$ and the transaction number N on the basis of the received transaction identifier $IDTR_{N,Si}$.

As explained above, after having checked the validity of the value $IDTR_N$ obtained, the entity B checks:
- on the basis of the filtering value $IDTR_N$ and the transaction identifier $IDTR_{N,Si}$, the identity of the Authorization Server $S_i$ which authorized the present transaction,
- that the pair ($IDTR_N, ID_{Si}$) has not already been "used up", and
- on the basis of the transaction identifier $IDTR_{N,Si}$ and the individual secret key $K_{SiB}$, the authenticity of the Authorization Server $S_i$.

If all of these checks are positive, the entity B recovers or calculates the session key $K_{N,Si}^{AB}$, and also, optionally, said secret key $K_{SiB,check}$ and/or said secret key $K_{N,Si,MAC3}^{AB}$ associated with this transaction.

Optionally, the entity B then checks that:
- the information which the entity B has received is consistent with the authentication code MAC3 (if present) and the session key $K_{N,Si}^{AB}$ or the secret key $K_{N,Si,MAC3}^{AB}$ and/or
- the information which the entity B has received is consistent with the datum $CHECK_{N,Si}^{AB}$ (if present) and the secret key $K_{SiB,check}$.

Finally (unless these optional checks yield a negative result), during a sub-step E4.2, the entity B extracts the original message MES from the authenticated message AM, and, where appropriate, transmits this original message MES to a recipient client B'.

Figure 3:
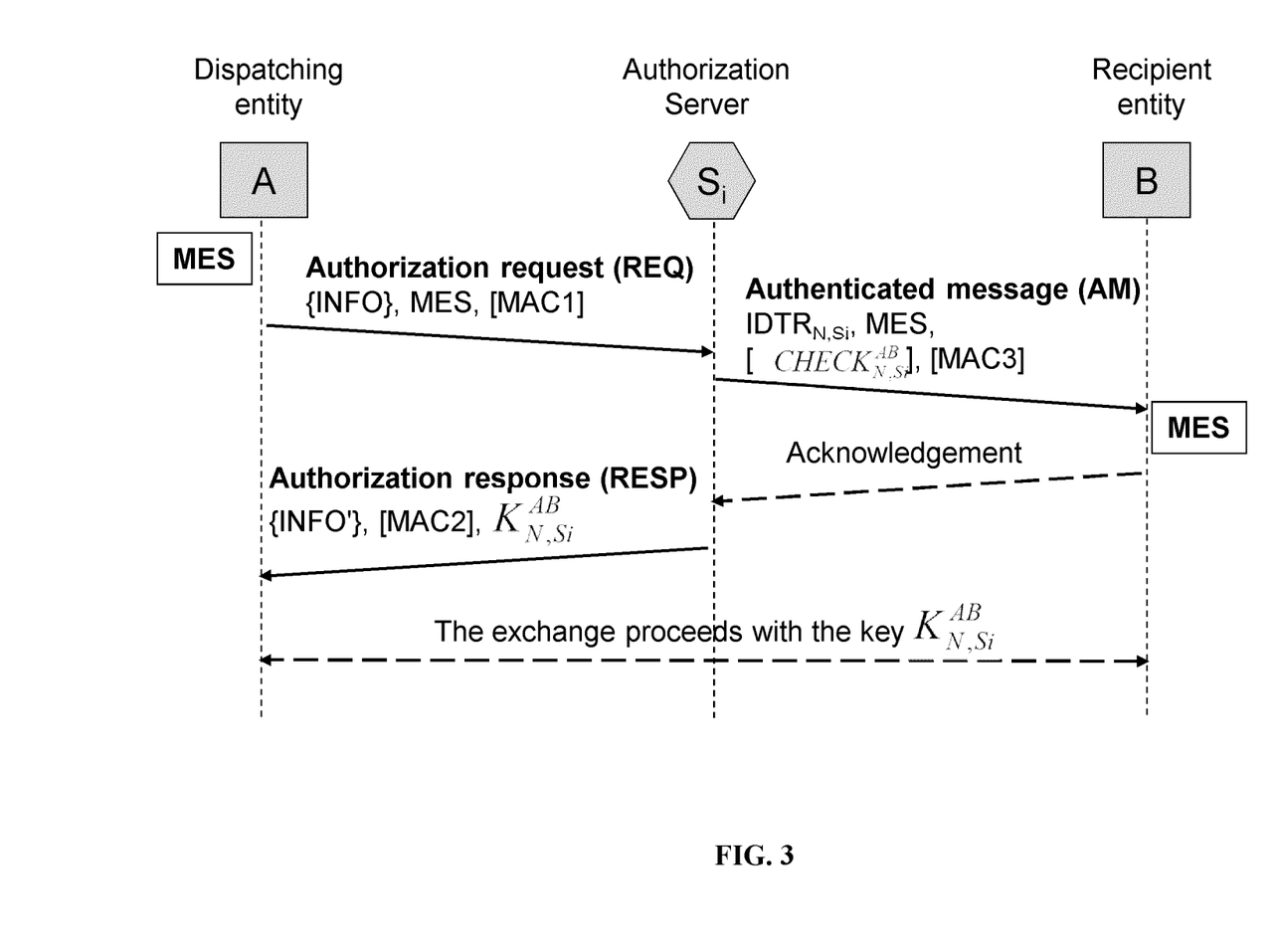
FIG. 3 shows schematically the steps of a method for secure communications according to a second embodiment of the invention.

FIG. 3 shows schematically the steps of a second embodiment of the method according to the invention.

In this embodiment, an entity A, referred to as the "dispatching client", wishes to send an original message MES to one or more entities B, said "dispatching client(s)". Moreover, this original message MES may, in certain applications (for example if the message MES is a VoIP call initiation request), simultaneously play the part of an authorization request REQ.

The present embodiment is essentially distinguished from the first embodiment, described above with reference to FIG. 2, in that the Authorization Server $S_i$ transmits the authenticated message AM to the entity B "directly", i.e. without using the entity A as a relay. This embodiment therefore has the disadvantage of excessive processing for the Authorization Server $S_i$, but it may nevertheless prove to be practical in certain architectures (see examples below).

The main steps of this embodiment will now be explained.

The first step E1 is analogous to the step E1 of the first embodiment, except that, in this second embodiment, the message MES must be entirely included in the authorization request REQ.

The second step E'2 is analogous to the step E2 of the first embodiment, except that, in this case, the authorization response RESP contains neither the transaction identifier $IDTR_{N,Si}$ nor the datum $CHECK_{N,Si}^{AB}$.

During a step E'3, the Authorization Server $S_i$ transmits the authenticated message AM comprising the original message MES, the transaction identifier $IDTR_{N,Si}$ and, optionally, the datum $CHECK_{N,Si}^{AB}$ "directly" to the entity B. When the integrity of the exchanges between $S_i$ and B is not ensured by the underlying transport protocol, the authenticated message AM preferably contains an authentication code MAC3 calculated over all or part of the aforementioned elements of this message AM; for this purpose, as in the first embodiment, it will be possible to use the session key $K_{N,Si}^{AB}$ or a secret key $K_{N,Si,MAC3}^{AB}$ derived from the session key $K_{N,Si}^{AB}$; alternatively, it will be possible here to use the secret key $K_{SiB}$ or a secret key derived from the secret key $K_{SiB}$.

It will be noted that, as shown in FIG. 3, the step E'3 may precede the step E'2. This operating order advantageously allows the transaction to be interrupted before the Authentication Server $S_i$ sends the authorization response RESP to the entity A, in the case where the entity B does not send an acknowledgement of receipt of the authenticated message AM to $S_i$ if such an acknowledgement of receipt was provided for, or in the case where the entity B sends an acknowledgement of receipt to $S_i$ in which the entity B declares that it refuses this transaction with the entity A.

Finally, the step E'4 is analogous to the step E4 of the first embodiment. It will be noted that this step E'4 must of course occur after step E'3, but that it may precede the step E'2.

Various possible architectures for the implementation of the invention will now be examined by way of examples.

The first three examples apply to VoIP. VoIP services and networks provide a particularly interesting application context, because, in addition to substantial security constraints, they also have constraints in terms of real time, the number of entities deployed, (currently several million in certain networks), the performance of the terminals, and also legal constraints imposing the ability to intercept sensitive communications. This legal interception requirement of course argues in favor of the checking of session keys by a trust center (in this case, the Authorization Server $S_i$), which could then be a proxy of a network operator.

(a) Intra-Domain VoIP Communications

The client entities A and B, as well as the Authorization Server $S_i$ form part of the network of the same operator. The Authorization Server $S_i$ is a VoIP proxy of this network which conventionally has a secret shared with each of the client terminals, this secret having been set up during the phase of subscription to the service, then checked during the phase of registration of the client terminal with the network.

The authorization request REQ sent by the entity A allows the Authorization Server $S_i$ to authenticate the entity A and to determine the routing to reach the entity B.

The call may then be set up directly between the entities A and B without the need to set up a connection TLS between A and B to ensure the integrity and confidentiality of the signaling. The message MES corresponds to the "INVITE" request.

(b) VoIP Mode 1 Interconnections

In this embodiment, the dispatching and recipient entities are located in two different networks, belonging to different operators; the dispatching domain is denoted D-EXP and the recipient domain D-DEST.

The entity A is one of the outgoing proxies of the dispatching domain D-EXP. The entity A serves a plurality of client terminals A' of the domain D-EXP or transmitting servers A' in the same domain, or in a third-party domain when the client terminal is in a situation of mobility.

The Authorization Server $S_i$ is one of the incoming proxies of the recipient domain D-DEST. The Authorization Server $S_i$ protects and serves one or more entities B which may belong to the recipient domain D-DEST or to third-party domains.

The entity B may correspond directly to the recipient client terminal. Alternatively, the entity B may correspond to a receiving terminal, forming part of the recipient domain D-DEST or of a third-party domain, in which case the true recipient client terminal corresponds to the entity B'.

In the authorization request REQ, the entity A references the recipient entity B via one or more identifiers at network, transport or application level, such as the network address of the entity B, the name of the domain to which the entity B belongs, an SIP_URI or Tel_URI designating the recipient client entity. Similarly, the entity A identifies itself by one or more identifiers at network, transport or application level, such as its network address or the name of the domain to which it belongs, or an SIP_URI or a Tel_URI designating the dispatching client entity.

The performance of the transaction with number N allows A and B to share the primary session key $K_{N,Si}^{AB}$. This session key allows the call set-up message INVITE to be authenticated. In addition, it can also serve to authenticate the other phases of the call ("CANCEL", "ACK", "BYE" requests or associated responses). It can also allow secondary keys to be derived for the encryption of media flows.

The authorization request REQ and the authorization response RESP are exchanged between a dispatching server and a recipient server, while the message AM is sent by a dispatching or transmitting server to a receiving server.

(c) VoIP Mode 2 Interconnections

As above, the dispatching and recipient entities are located in two different networks denoted D-EXP and D-DEST.

The entity A is a client terminal of the domain D-EXP or a transmitting server of the dispatching domain or of a third-party domain. If the entity A is a transmitting server, the true dispatching client corresponds to an entity A'.

The Authorization Server $S_i$ is one of the outgoing proxies of the dispatching domain D-EXP, i.e. a dispatching server.

The Authorization Server $S_i$ serves the entities A of the dispatching domain or of third-party domains, and authorizes communications with the recipient domain.

The entity B is one of the incoming proxies of the recipient domain DEST. This entity serves and protects entities B' which are either directly client terminals or receiving servers belonging to the recipient domain or to third-party domains.

The authorization request REQ and the authorization response RESP are exchanged in the dispatching domain or between the transmitting domain and the recipient domain, while the message AM is sent by a client entity or a transmitting server to the recipient server.

(d) Dispatch of an E-Mail or Instant Message IM

The architecture is similar to the architecture for the VoIP interconnections (mode 1 or mode 2) as far as the entities A, A', S, B, and B' are concerned.

The entities used in the transaction requests to designate the entities A or A' (and B or B' respectively) are e-mail addresses, IM addresses or domain names.

The performance of the transaction with number N allows A and B to share the primary session key $K_{N,Si}^{AB}$. This session key is used to authenticate and ensure the integrity of the e-mail or IM message sent from A to B.

(e) Setting Up a Secure Connection

The entity A sends an authorization request to the Authorization Server $S_i$ which protects access to the entity B with which the entity A wishes to communicate.

The authorization request comprises the identifiers of the entities A and B, in the form of network or transport addresses, or application addresses in relation to the service concerned.

The performance of the transaction with number N allows A and B to share the primary session key $K_{N,Si}^{AB}$. This session key is then used to set up a secure connection (IPSec, TLS, DTLS, or other) between the entities A and B.

(f) Application to a DNS/ENUM Service

This application of the method according to the invention relates to a communication service, where the Authorization Server $S_i$ is a DNS or ENUM server in the case of VoIP applications. This allows attacks to be avoided in which a calling VoIP entity claims a telephone number which is not allocated to its network or to its application domain.

In this example application, the entity A is one of the outgoing proxies of the domain "domain1" and has a secret shared with the Authorization Server $S_i$. Before transmitting a call to the entity B, the entity A sends an authorization request to the Authorization Server S to authenticate the calling party and obtain a secret key for the call to B.

The Authorization server $S_i$ is a DNS/ENUM server which has secrets $K_{SiA}$, $K_{SiB}$ shared with a certain number of domains, thanks to a prior communication phase. The Authorization Server $S_i$ plays the part of a trust center.

The entity B is one of the incoming proxies of the domain "domain2" and has a secret shared with the Authorization Server $S_i$.

The performance of the transaction allows the entity B to check that the calling party identifier presented by the entity A in the request INVITE has indeed been authenticated by the Authorization Server $S_i$. It furthermore allows the entities A and B to have a shared secret $K_{N,Si}^{AB}$ which can be used to protect the continuation of their exchange or media flows.

The implementation of the invention within the nodes of the telecommunications network (notably the terminals or servers of the entities subscribing to the secure communications service according to the invention, or the Authorization Servers) can be achieved by means of software and/or hardware components.

It will be possible for the software components to be integrated into a conventional computer program for network node management. This is why, as indicated above, the present invention also relates to a computer system. In a conventional manner, this computer system comprises a central processing unit controlling a memory by means of signals, as well as an input unit and an output unit. Furthermore, this computer system can be used to execute a computer program comprising instructions for carrying out the method for secure communications according to the invention.

In fact, the invention also relates to a computer program downloadable from a communications network comprising instructions for carrying out at least some of the steps of a method for secure communications according to the invention, when it is executed on a computer. This computer program can be stored on a computer-readable medium and can be executable by a microprocessor.

This program can use any programming language and can be in the form of source code, object code or intermediate code between source code and object code, such as in a partially compiled form or in any other desirable form.

The invention also relates to an information medium which is non-removable, or partially or totally removable, computer-readable, and comprising instructions of a computer program as mentioned above.

The information medium can be any given entity or device capable of storing the program. For example, the medium may comprise a storage means, such as a ROM, for example a CD-ROM or microelectronic circuit ROM, or a magnetic recording means, for example a USB stick ("USB flash drive") or a hard disk.

Moreover, the information medium may be a transmissible medium such as an electrical or optical signal which can be routed via an electrical or optical cable, by radio or by other means. The computer program according to the invention may, in particular, be downloaded from an Internet network.

Alternatively, the information medium may be an integrated circuit in which the program is incorporated, the circuit being suitable for being used in a secure communications device according to the invention.

The invention claimed is:

1. A method for secure communications in a telecommunications network, the network comprising a group of servers $S_i$ (where i=1, 2, . . . , p, and p is a strictly positive integer), referred to as Authorization Servers, the method comprising, for a transaction between an entity A and an entity B of the network, the following steps:

a) the entity A sends to one of the Authorization Servers $S_i$ an authorization request (REQ) in which the entity A identifies and authenticates itself as the holder of an identifier $ID_A$;

b) the entity A declares to the Authorization Server $S_i$ its intention to communicate with the entity B; the Authorization Server $S_i$ determines an individual secret key $K_{SiB}$ which it shares with the entity B;

c) the Authorization Server $S_i$ generates a session key $K_{N,Si}^{AB}$ which is a one-way function of the individual secret key $K_{SiB}$, and which is also a function of an integer N, referred to as the transaction number, allocated to the transaction; the Authorization Server $S_i$ sends the session key $K_{N,Si}^{AB}$ to the entity A;

d) the Authorization Server $S_i$ generates a filtering value $IDTR_N$, which is a function dependent at least on the transaction number N in a non-invertible manner; the Authorization Server $S_i$ generates a transaction identifier $IDTR_{N,Si}$, which is a function of the filtering value $IDTR_N$, of the individual secret key $K_{SiB}$, and of an identifier $ID_{Si}$ of the Authorization Server $S_i$;

e) the Authorization Server $S_i$ supplies the entity B with elements comprising at least the transaction identifier $IDTR_{N,Si}$;

f) using the transaction identifier $IDTR_{N,Si}$, received during the step e), the entity B:
   identifies the current filtering value $IDTR_N$ within a set of filtering values pre-calculated by the entity B and associated with at least one predicted value of the transaction number, and
   obtains the Authorization Server identifier $ID_{Si}$, and infers the corresponding individual secret key $K_{SiB}$ from the Authorization Server identifier $ID_{Si}$; and g) the entity B generates the session key $K_{N,Si}^{AB}$.

2. The method for secure communications as claimed in claim 1, wherein the entity B checks, during the step f), that the Authorization server $S_i$ has not already authorized a preceding transaction with the same number N for the entity B.

3. The method for secure communications as claimed in claim 1, wherein the entity B checks, during the step f), that the value of the received transaction identifier $IDTR_{N,Si}$ is consistent with the individual secret key $K_{SiB}$.

4. The method for secure communications as claimed in claim 1, wherein the Authorization Servers use an algorithm common to all of the Authorization servers in the group to determine the successive transaction numbers N relating to a given entity B.

5. The method for secure communications as claimed in claim 4, wherein the transaction number N determined, for a given entity B, by any given Authorization Server $S_i$ at a given time $t_d$, is a predetermined function of the time $t_d$ and of a reference number $N_B$, the value of which is a secret shared by the entity B and by all of the Authorization servers $S_i$ in the group.

6. The method for secure communications as claimed in claim 4, wherein the transaction number N determined, for a given entity B, by any given Authorization Server $S_i$ is a predetermined sequencing function of the preceding transaction number, and wherein the Authorization Server $S_i$ sends a synchronization message to the entity B each time the Authorization Server $S_i$ determines a value of the transaction number belonging to a series of predetermined values for the entity B.

7. The method for secure communications as claimed in claim 1, wherein the elements which the Authorization Server $S_i$ supplies to the entity B during the step e) also comprise a datum $CHECK_{N,Si}^{AB}$ dependent on the transaction number N and inferred, by using a cryptographic function dependent on a secret key $K_{SiB,check}$ derived from the secret key $K_{SiB}$, from a set of elements obtained from at least one of the authorization request (REQ) and the transaction number N.

8. The method for secure communications as claimed in claim 7, wherein the entity A supplies the entity B with the identifier $ID_A$ of the entity A, or a derived identifier $ID'_A$.

9. The method for secure communications as claimed in claim 8, wherein:
   the set of elements from which the datum $CHECK_{N,Si}^{AB}$ is inferred comprises the identifier $ID_A$ of the entity A or the derived identifier $ID'_A$, and
   during the step f), the entity B checks, by using the secret key $K_{SiB,check}$, the consistency between the datum $CHECK_{N,Si}^{AB}$ and the elements comprising the identifier $ID_A$ or the derived identifier $ID'_A$.

10. An Authorization Server $S_i$ (where i=1, 2, ..., p, and p is a strictly positive integer) configured to provide secure communications in a telecommunications network during a transaction between an entity A and an entity B, the Authorization Server programmed to:
   identify and authenticate entity A holding an identifier $ID_A$,
   determine an individual secret key $K_{SiB}$ which the Authorization Server $S_i$ shares with an entity B with which the entity A declares its intention to communicate,
   generate a session key $K_{N,Si}^{AB}$ and send it to the entity A, the session key $K_{N,Si}^{AB}$ being a one-way function of the individual secret key $K_{SiB}$ and being a function of an integer N, referred to as the transaction number, allocated to the transaction,
   generate a filtering value $IDTR_N$, which is a function dependent at least on the transaction number N in a non-invertible manner,
   generate a transaction identifier $IDTR_{N,Si}$, which is a function of the filtering value $IDTR_N$, of the individual secret key $K_{SiB}$, and of an identifier $ID_{Si}$ of the Authorization Server $S_i$ so that the value of $IDTR_N$ corresponding to a predictable value for the transaction number N and subsequently the value of the session key $K_{N,Si}^{AB}$ can be deduced therefrom by the entity B, and
   supply the entity B with elements comprising at least the transaction identifier $IDTR_{N,Si}$.

11. A device, referred to as entity B, configured to provide secure communications in a telecommunications network, wherein, during a transaction involving the entity B and an entity A, the entity B is configured to:
   receive elements comprising at least a transaction identifier $IDTR_{N,Si}$ generated by an Authorization Server $S_i$ (where i=1, 2, ..., p, and p is a strictly positive integer), wherein the transaction identifier $IDTR_{N,Si}$ is a function of a filtering value $IDTR_N$, an individual secret key $K_{SiB}$ shared by the entity B and the Authorization Server $S_i$, and an identifier $ID_{Si}$ of the Authorization Server $S_i$, and wherein the filtering value $IDTR_N$ is a function dependent at least, in a non-invertible manner, on an integer N, referred to as the transaction number, allocated to the transaction,
   use the transaction identifier $IDTR_{N,Si}$ to:
      identify the current filtering value $IDTR_N$ within a set of filtering values pre-calculated by the entity B and associated with at least one predicted value of the transaction number, and
      obtain the Authorization Server identifier $ID_{Si}$, and infer the corresponding individual secret key $K_{SiB}$ from the Authorization Server identifier $ID_{Si}$; and
   generate a session key $K_{N,Si}^{AB}$ which is a function of the transaction number N and a one-way function of the individual secret key $K_{SiB}$.

12. The device for secure communications as claimed in claim 11, wherein the device is further configured to provide a correspondence table relating at least one predicted value of the transaction number with the associated pre-calculated filtering value.

13. A device, referred to as entity A, configured to provide secure communications in a telecommunications network, wherein, during a transaction involving the entity A and an entity B, the entity A is configured to:
   identify itself and authenticate itself as the holder of an identifier $ID_A$ by communicating with an Authorization Server $S_i$ (where i=1, 2, ..., p, and p is a strictly positive integer),
   declare to the Authorization Server $S_i$ its intention to communicate with an entity B,
   receive a session key $K_{N,Si}^{AB}$ from the Authorization Server $S_i$, wherein the session key $K_{N,Si}^{AB}$ is a one-way function of an individual secret key $K_{SiB}$ shared by the Authorization Server $S_i$ and the entity B, and wherein the session key $K_{N,Si}^{AB}$ is a function of an integer N, referred to as the transaction number, allocated to the transaction,
   receive a transaction identifier $IDTR_{N,Si}$ from the Authorization Server $S_i$, wherein the transaction identifier $IDTR_{N,Si}$ is a function of a filtering value $IDTR_N$, the individual secret key $K_{SiB}$, and an identifier $ID_{Si}$ of the Authorization Server $S_i$, and wherein the filtering value $IDTR_N$ is a function dependent at least, in a non-invertible manner, on the transaction number N, so that the value of $IDTR_N$ corresponding to a predictable value for the transaction number N and subsequently the value of the session key $K_{N,Si}^{AB}$ can be deduced therefrom by the entity B, and send elements comprising at least the transaction identifier $IDTR_{N,Si}$ to the entity B.

14. A non-transitory data storage device comprising computer program code instructions that when executed perform the steps of the method for secure communications as claimed in claim 1.

15. A non-transitory data storage device which is non-removable, or partially or totally removable, comprising computer program code instructions for allowing an Authorization Server to carry out the steps of a method for secure communications according to claim 1.

16. A non-transitory data storage device which is non-removable, or partially or totally removable, comprising program code instructions for allowing an entity A to carry out the steps of a method for secure communications according to claim 1.

17. A non-transitory data storage device which is non-removable, or partially or totally removable, comprising computer program code instructions for allowing an entity B to carry out the steps of a method for secure communications according to claim 1.

* * * * *